United States Patent [19]

Van et al.

[11] Patent Number: 5,500,850
[45] Date of Patent: Mar. 19, 1996

[54] OPTICAL DISK WITH GROOVES AND PITS OF DIFFERENT DEPTHS

[75] Inventors: Kazuo Van; Kenji Ohta; Tetsuya Inui; Toshikazu Nagaura; Hirotoshi Takemori, all of Nara; Hirotaka Toki, Kashihara, all of Japan

[73] Assignee: Sharp Kabushiki Kaisha, Osaka, Japan

[21] Appl. No.: 346,173

[22] Filed: Nov. 22, 1994

Related U.S. Application Data

[62] Division of Ser. No. 32,540, Mar. 17, 1993, Pat. No. 5,399,461, which is a continuation of Ser. No. 679,997, Apr. 1, 1991, abandoned, which is a continuation of Ser. No. 233,540, Aug. 18, 1988, abandoned.

[30] Foreign Application Priority Data

| Aug. 21, 1987 | [JP] | Japan | 62-208948 |
| Feb. 5, 1988 | [JP] | Japan | 63-26237 |
| Aug. 3, 1988 | [JP] | Japan | 63-194164 |

[51] Int. Cl.$^6$ .................................................. G11B 7/24
[52] U.S. Cl. ........................................ 369/275.4; 430/321
[58] Field of Search .................... 369/275.4, 275.3, 369/93, 277, 278, 279; 430/321; 428/64

[56] References Cited

U.S. PATENT DOCUMENTS

| 4,423,502 | 12/1983 | Dil | 369/275.4 |
| 4,586,173 | 4/1986 | Ando | 369/275.4 |
| 4,587,648 | 5/1986 | Ando | 369/275.4 |
| 4,734,904 | 3/1988 | Imanaka et al. | 369/275.4 |
| 5,060,223 | 10/1991 | Segawa | 369/275.4 |
| 5,144,552 | 9/1992 | Abe | 369/275.4 |
| 5,353,277 | 10/1994 | Yasuda et al. | 369/275.3 |
| 5,399,461 | 3/1995 | Van et al. | 369/275.4 |
| 5,402,411 | 3/1995 | Maeda et al. | 369/275.4 |

FOREIGN PATENT DOCUMENTS

| 83193 | 12/1982 | European Pat. Off. |
| 3620331 | 1/1987 | Germany |

OTHER PUBLICATIONS

English Abstract of Japanese Document 61-29635A, Dec. 1986.

*Primary Examiner*—Georgia Y. Epps
*Assistant Examiner*—Tan Dinh

[57] ABSTRACT

An optical disk for use in an optical memory device having guide grooves and pits on one surface thereof, wherein the depth of the guide grooves is different from that of the pits and the distance from the bottom face of each of the guide grooves to the other surface of the optical disk opposite to the one surface of the optical disk on which the guide grooves and pits are disposed is the same as the distance from the bottom face of each of the pits to the other surface of the optical disk opposite to the one surface of the optical disk on which the guide grooves and pits are disposed, and a method for the production of optical memory master plates that are used for the production of the above-mentioned optical disk.

6 Claims, 6 Drawing Sheets

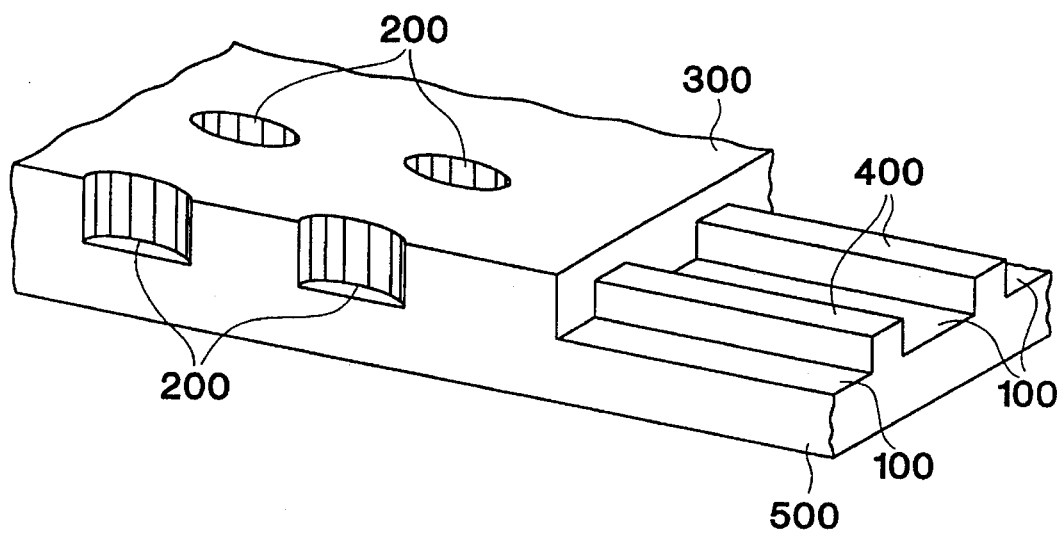
FIG. 10
PRIOR ART
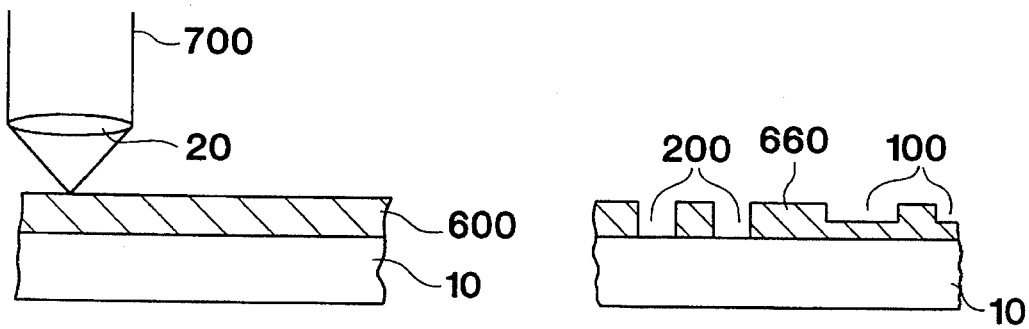
FIG. 11a
PRIOR ART
FIG. 11b
PRIOR ART
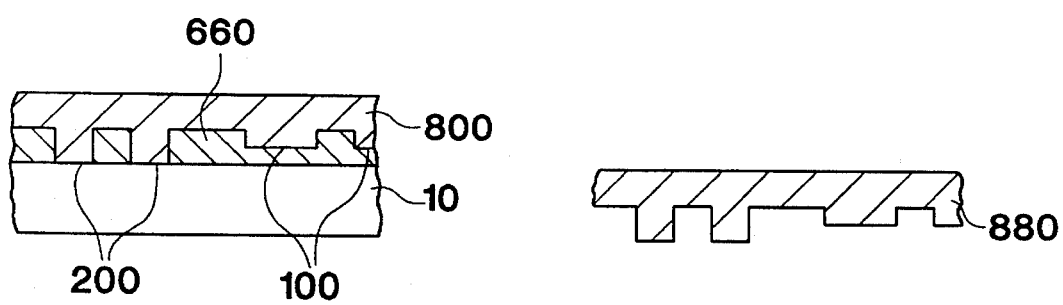
FIG. 11c
PRIOR ART
FIG. 11d
PRIOR ART

OPTICAL DISK WITH GROOVES AND PITS OF DIFFERENT DEPTHS

This application is a divisional of application Ser. No. 08/032,540, filed on Mar. 17, 1993, now U.S. Pat. No. 5,399,461, which is a continuation of Ser. No. 07/679,997 filed on Apr. 1, 1991, now abandoned, which is a continuation of Ser. No. 07/233,540, filed on Aug. 18, 1988, now abandoned the entire contents of which are hereby incorporated by reference.

BACKGROUND OF THE INVENTION

1. Field of the Invention

This invention relates to an optical disk for use in optical memory devices that conduct a recording operation, a regenerating operation, or an erasing operation of information using laser beams, and to a method for the production of the optical disk.

2. Description of the Prior Art

In recent years, optical memory devices have become recognized as a dense and mass memory device. Optical memory devices can be classified into three groups consisting of regenerative memory devices, write once memory devices and rewritable memory devices. Optical memory devices, which can be classified as write once memory devices and rewritable memory devices, generally have guide tracks on a disk made of glass or plastics so as to guide a light beam for recording and/or regenerating information to a given portion of the optical memory device. A portion of each of the guide tracks is formed into a pit-shape, resulting in a track address by which the position of the guide track can be identified. When the sectionalization of each guide track is needed to administer information, sector addresses are also disposed in the disk.

FIG. 10 shows a conventional disk 500 with guide tracks that are constituted by grooves 100. Information such as track addresses, sector addresses or the like disposed on the disk 500 in advance are formed into the shape of pits 200. In general, on a disk with guide grooves and pits, a recording medium is formed by the vacuum evaporation method, the sputtering method, the spin-coating method or the like. When necessary, a protective substrate and/or a resin film is laminated on the recording medium, resulting in an optical memory device.

Because information is recorded on the guide tracks 100 (FIG. 10) using light such as laser beams or the like, the shape of the grooves 100 significantly influences the tracking servo signal characteristics essential to keeping a light beam spot on a given guide track. To obtain good tracking servo signal characteristics, the depth of guide grooves formed in the disk are usually set to be around $\lambda/8$ n (wherein $\lambda$ is a wavelength of light and n is the refractive index of the disk). In contrast, because information such as track addresses, sector addresses or the like are formed into a pit-shape on the disk and read off by utilizing a diffraction effect of light in the pits, the depth of each pit is set to be around $\lambda/4$ n. In this way, the depth of guide grooves 100 of a disk 500 for use in optical memory devices is different from the depth of the pits 200 of the said disk. This kind of disk 500 is designed such that, as shown in FIG. 10, one surface 300 of the disk 500 is flush with the surface of the land 400 positioned between the adjacent guide grooves 100 that are formed on the said surface 300 of the disk 500.

FIGS. 11a to 11d show a process for producing the above-mentioned disk 500. As shown in FIG. 11a, a resist film 600, formed on a disk plate 10 is illuminated with a laser beam 700, resulting in guide grooves and pit latent images on the resist film 600. The intensity of illumination of laser beam 700 for formation of guide groove latent images is set lower than that of the formation of pit latent images. Then, the resist film 600 is developed, as shown in FIG. 11b, resulting in a pattern 660 corresponding to the guide grooves 100 and pits 200 shown in FIG. 10, the depths of which are different from each other. The disk plate 10 with a pattern 660 is then subjected to a dry or wet etching treatment, resulting in a disk 500 such as that of FIG. 10. Alternatively, as shown in FIG. 11c, a metal film 800 made of nickel (Ni) or the like is formed on the disk plate 10 with a pattern 660 by the sputtering method, the vacuum evaporation method and/or the electroforming method, resulting in a stamper (i.e., a master plate) 880 as shown in FIG. 11d. By the use of the stamper 880, a plastic disk with a structure such as that shown in FIG. 10 can be formed by an injection technique.

The shape of the bottom of each of the grooves 100 formed on a disk 500 is a transcription of the shape of the top surface of the patterned photoresist film 660. Thus the bottom face of each of the grooves of the disk 500 mirrors the unevenness of the top surface of the patterned resist film 660. This unevenness causes noise when information written into the guide grooves (i.e., guide tracks) 100 of the disk 500 using a laser beam is regenerated by a laser beam producing inferior regenerated-signals.

SUMMARY OF THE INVENTION

The optical disk of this invention, overcomes the above-discussed and numerous other disadvantages and deficiencies of the prior art, by having guide grooves and pits on one surface thereof, wherein the depth of the guide grooves is different from that of the pits and the distance from the bottom face of each of said guide grooves to the other surface of said optical disk opposite to said one surface of said optical disk on which said guide grooves and pits are disposed is the same as the distance from the bottom face of each of said pits to the other surface of said optical disk opposite to said one surface of said optical disk on which said guide grooves and pits are disposed.

The method for the production of optical memory master plates of this invention comprises forming a photoresist film on a disk plate, exposing said photoresist film to beams, developing said photoresist film resulting in a patterned photoresist film, and forming a metal film on said disk plate with the patterned photoresist film, wherein in said exposure process, a plurality of beams that are disposed in the radius direction of said disk plate illuminate said photoresist film through an object lens, then said plurality of beams are shifted radially in such a way that an area that is exposed after said beams are shifted is superposed on a part of the area that has been exposed before said beams are shifted, and then said beams illuminate said photoresist film, resulting in an exposed area that is wider than the exposed area formed before said beams are shifted, said widely exposed area constituting a guide-groove latent image.

In a preferred embodiment, the disk plate is made of glass or plastics. The above-mentioned optical disk is produced by the use of the master plate.

The method for the production of optical memory master plates of this invention comprises forming a photoresist film on a disk plate, exposing said photoresist film to beams, developing said photoresist film resulting in a patterned photoresist film, and forming a metal film on said disk plate with the patterned photoresist film, wherein in said exposure process, a first beam and a second beam illuminate said photoresist film with a fixed gap therebetween in the radius direction of said disk plate so as to form a first exposed area and a second exposed area, then these beams are shifted radially with said fixed gap therebetween in such a way that said first beam is superposed with a part of said second exposed area, then said first and second beams illuminate said photoresist film, and then the above-mentioned steps are repeated, resulting in unexposed areas with a width that corresponds to said fixed gap and widely exposed areas that are composed of said first and second exposed areas.

In a preferred embodiment, the disk plate is made of glass or plastics. The above-mentioned optical disk is produced by the use of the master plate.

Thus, the invention described herein makes possible the objectives of (1) providing an optical disk for use in optical memory devices, in which the bottom face of each of the guide grooves is so flat and smooth that optical memory devices that produce high quality regenerated signals can be obtained; and (2) providing a method for producing the optical disk by which the guide grooves can be formed with accuracy by means of laser beams that are at a relatively low intensity level.

BRIEF DESCRIPTION OF THE DRAWINGS

The present invention will become more fully understood and its numerous objects and advantages more apparent to those skilled in the art by reference to the accompanying drawings which are given by way of illustration only, and thus are not limitative of the present invention, and wherein

FIG. 10 is a perspective view showing a conventional disk;

FIGS. 11a to 11d are schematic diagrams showing a production process of the disk shown in FIG. 10.

DESCRIPTION OF THE PREFERRED EMBODIMENTS

The present invention provides an optical disk having pits and guide grooves in which the bottom face of each pit is flush with the bottom face of each guide groove.

EXAMPLE 1

Figure 1:
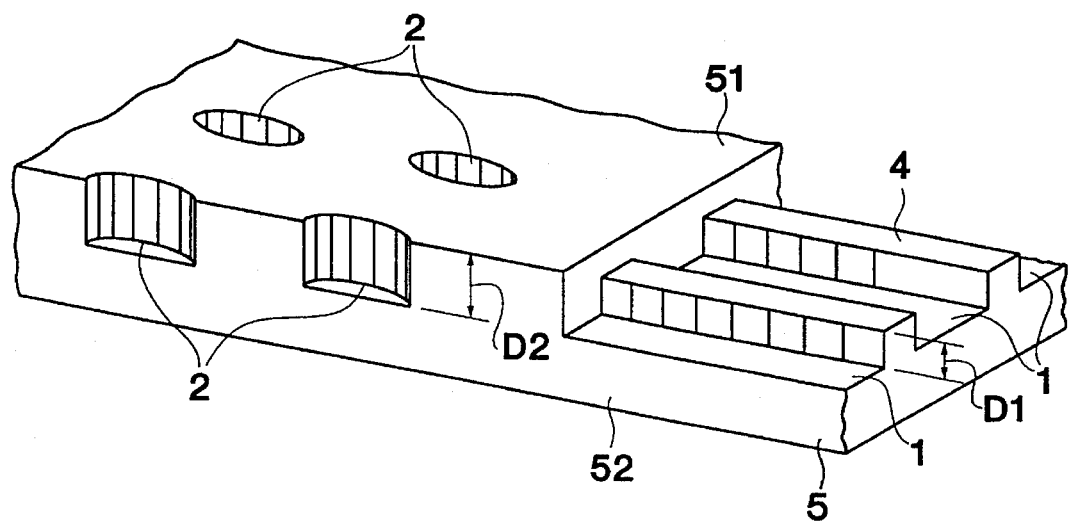
FIG. 1 is a perspective view showing an enlarged portion of an optical disk of the present invention for use in an optical memory device.

FIG. 1 shows an optical disk according to the present invention, which is made of glass, plastics or the like. The optical disk 5 has guide grooves 1, which function as guide tracks, and pits 2 on one surface 51 thereof. Both the bottom face of each groove 1 and the bottom face of each pit 2 are positioned at the same distance from the other surface 52 of the optical disk 5; that is, the bottom face of each of the grooves 1 is flush with that of each of the pits 2. The depth D1 of each of the grooves 1 is different from the depth D2 of each of the pits 2. The value of D1 is set to be approximately $\lambda/8$ n and the value of D2 is set to be usually in the range from approximately $\lambda/8$ n to $\lambda/4$ n (wherein $\lambda$ is a wavelength of light and n is the refractive index of the optical disk).

Figure 2A:
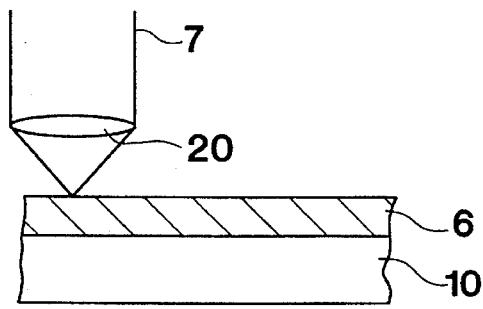
FIGS. 2a to 2d are schematic diagrams illustrating a production process for making the optical disk of FIG. 1.
Figure 2B:
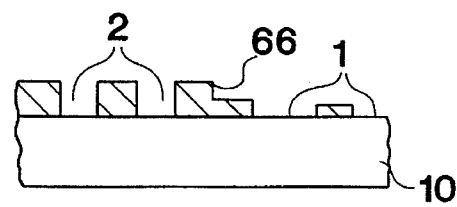

FIGS. 2a to 2d show a production process for the optical disk shown in FIG. 1. On a disk plate 10 of glass or plastics, as shown in FIG. 2a, a photoresist film 6 is formed, which is then illuminated with light 7 such as laser beams or the like via an optical lens 20 so as to form latent patterns corresponding to the desired shape of guide grooves 1 and pits 2 shown in FIG. 1. Then, the photoresist film 6 with a latent pattern is developed, as shown in FIG. 2b, resulting in a pattern 66 that corresponds to the guide grooves 1 and the pits 2 shown in FIG. 1.

Figure 3:
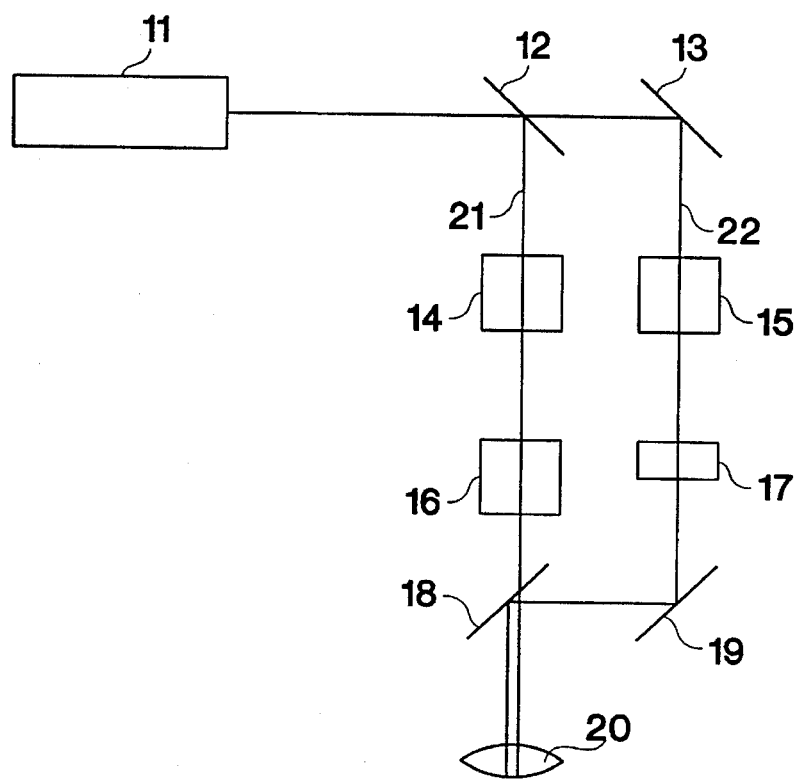
FIG. 3 is a diagram showing an optical system used in the production process shown in FIGS. 2a to 2d.

The production of such a pattern 66 is described in detail below. FIG. 3 shows an optical system with a laser apparatus 11 used in the above-discussed process for the production of pattern 66. The optical system includes a laser apparatus 11, beam splitters 12 and 18, reflectors 13 and 19, optical modulators 14 and 15, a deflector 16, and an ½ wavelength plate 17. A laser beam emitted from the laser apparatus 11 is split into two laser beams 21 and 22 by the beam splitter 12. The laser beam 21 arrives at the beam splitter 18 through the optical modulator 14 and the deflector 16. The other laser beam 22 is reflected by the reflector 13 and arrives at the reflector 19 through the optical modulator 15 and the ½ wavelength plate 17. The laser beam 22 is reflected by the reflector 19 and arrives at the beam splitter 18. The laser beams 21 and 22 meet in the beam splitter 18 and are incident together upon an object lens 20. The ½ wavelength plate 17 functions to change the wave surface of the laser beam 22, thereby preventing the laser beams 22 from interfering with the laser beam 21.

Figure 4:
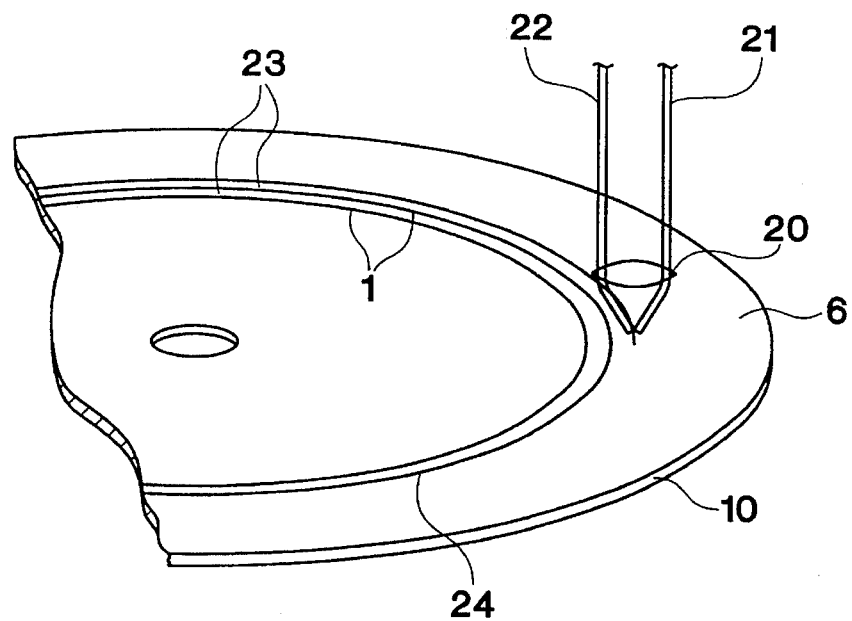
FIG. 4 is a schematic diagram showing an exposing process for production of an optical memory master plate used for the production of an optical disk according to present invention.

FIG. 4 shows the exposure of a photoresist film 6 to the laser beams 21 and 22 at the times of the production of an optical memory master plate.

Figure 5A:
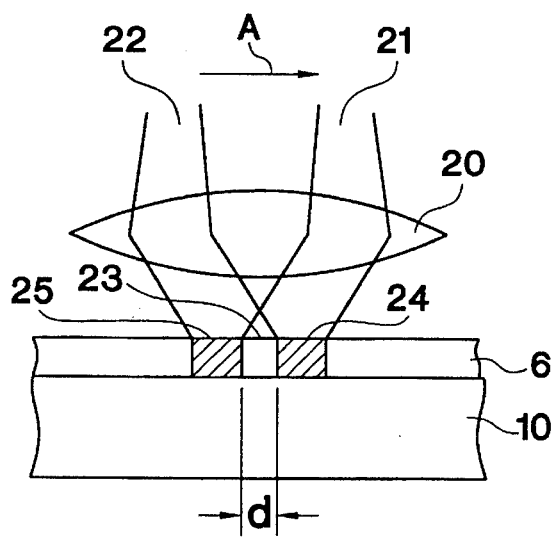
FIGS. 5a–5b and 6a–6b are schematic diagrams showing the steps for formation of guide groove latent images on photoresist film in the exposing process shown in FIG. 4.
Figure 5B:
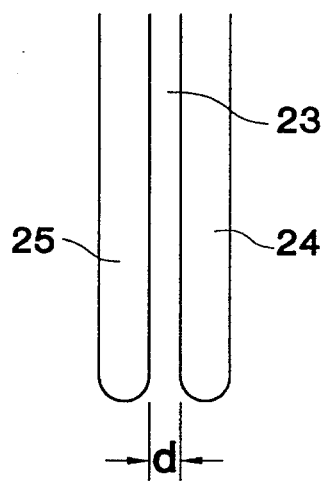
Figure 6A:
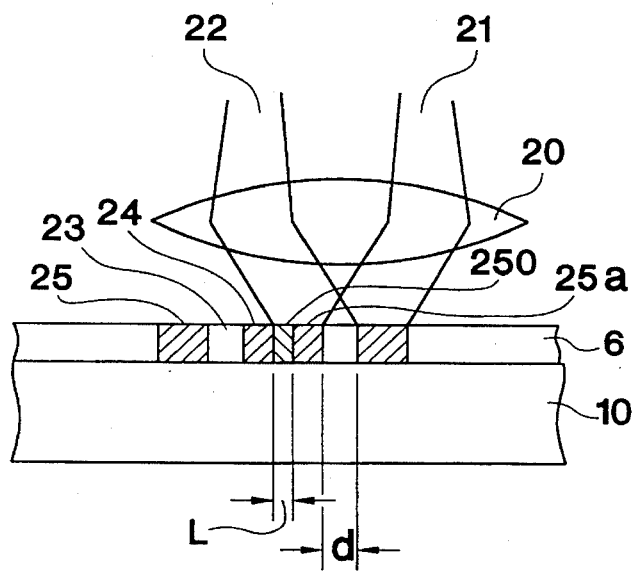
Figure 6B:
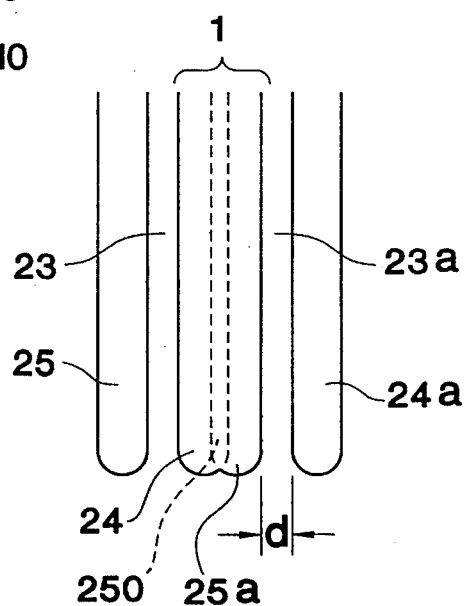

FIGS. 5a–5b and 6a–6b show the steps for formation of guide groove latent images on the photoresist film in the exposing process shown in FIG. 4. The laser beams 21 and 22 condensed into a spot fashion, respectively, by the object lens 20 illuminate the top surface of the photoresist film 6 in such a way that the laser beam spots are positioned at a fixed distance d therebetween in the radius direction of the disk plate 10 (FIGS. 5a and 5b). The unexposed area 23 that is positioned between the beams 21 and 22 constitutes an area corresponding to a land 4 of FIG. 1 after it is developed. The exposed areas 24 and 25 that are exposed to the beams 21 and 22 constitute areas corresponding to guide grooves 1 of FIG. 1 after they are developed. Then, the optical system is shifted in the radius direction of the disk plate 10 (i.e., in the direction of arrow A) so that the light spot of the laser beam 22 can be superposed on a part of the above-mentioned exposed area 24 by a distance L. Then, the disk plate 10 is rotated, so that as shown in FIGS. 6a and 6b, an exposed area 1 that is composed of the above-mentioned exposed area 24 and an newly exposed area 25a, both of which overlap by the area 250 with a width L, is formed and at the same time, an exposed area 24a is newly formed across an unexposed area 23a with a distance d from the said exposed area 1.

The above-mentioned steps are repeated, and the exposed areas 1 that are wider than the exposed area 24 or 25 are formed on the photoresist film 6. The width d of the unexposed areas 23 and 23a has no relation with the shifting pitch of the optical system and can be adjusted by changes in the gap between the laser beams 21 and 22, so as to be maintained precisely.

Figure 7A:
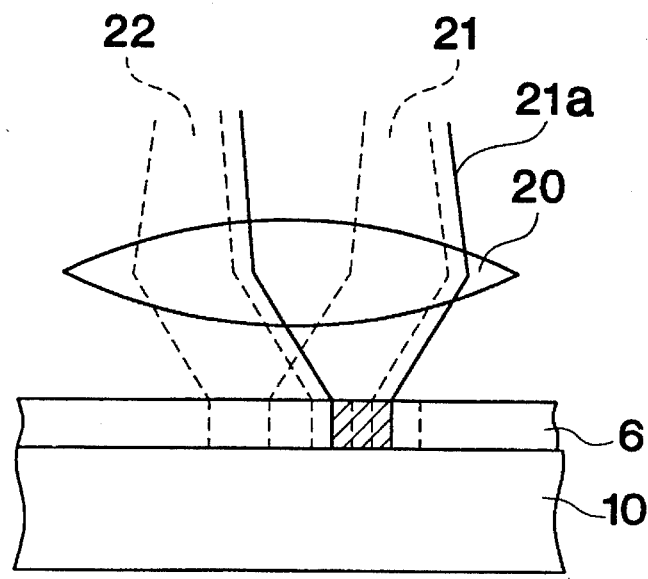
FIGS. 7a and 7b are schematic diagrams showing the steps for formation of pit latent images on a photoresist film in the exposing process shown in FIG. 4.
Figure 7B:
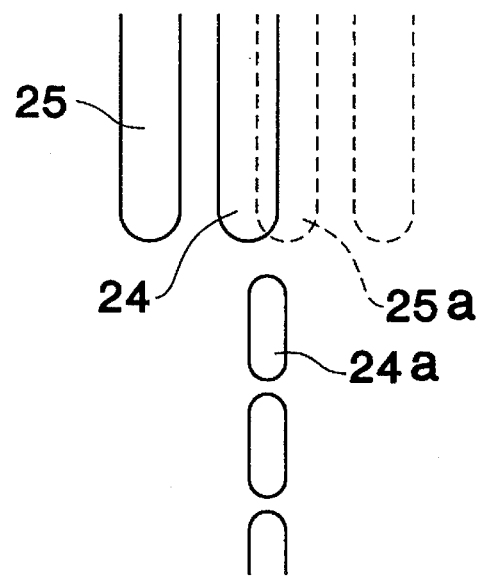
Figure 8:
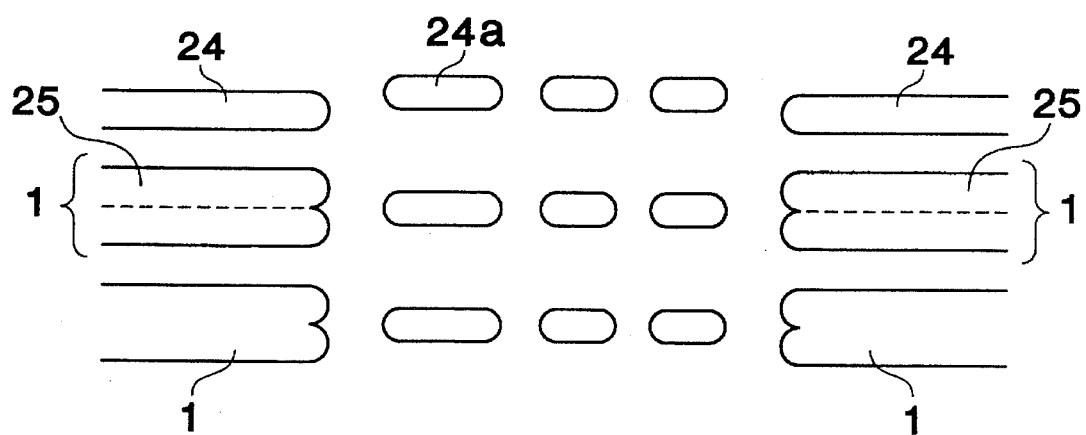
FIG. 8 is a schematic diagram showing the disposition of pits and grooves on a photoresist film corresponding to the header of the master plate according to the method of the present invention.
Figure 9:
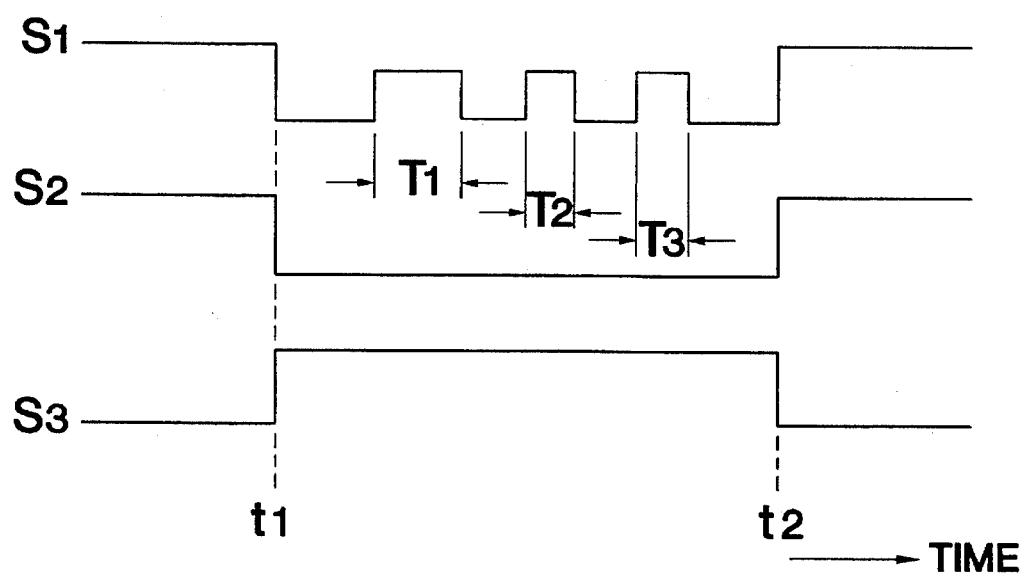
FIG. 9 is the time charts of the modulating signals and the deflecting signals of laser beams by which the pit latent images and the guide groove latent images corresponding to the pits and the grooves of FIG. 8 are formed on the photoresist film.

FIGS. 7a and 7b show the step for the formation of pit latent images on the photoresist film corresponding to the header of the optical memory master plate. FIG. 8 shows the disposition of pits and guide grooves on the photoresist film corresponding to the header of the master plate. FIG. 9 shows time charts of modulating signals and deflecting signals of the laser beams 21 and 22 by which the exposed areas of FIG. 8 are formed.

The modulating signals S1 and S2 (FIG. 9) of the laser beams 21 and 22, respectively, are output and the exposed areas 24 and 25 are formed on the photoresist film 6. At a time of t1, the modulating signals S1 and S2 of the laser beams 21 and 22 are off and the deflecting signal S3 of the laser beam 21 is on (FIG. 9), so that as shown in FIG. 7a, the laser beam 21 is deflected toward the position 21a and the incidence of the laser beams 21 and 22 upon the object lens 20 is cut off. Then, during the time periods T1, T2 and T3 the modulating signal S1 of the laser beam 21 is output (FIG. 9) and the laser beam 21a illuminates the photoresist film 6, resulting in exposed areas 24a with a narrow width on the header of the master plate. The output power of the laser beam 21a is slightly lowered, which makes the spot diameter small, and at the same time, the spread of the laser beam 21a is deflected by the deflector 16 that receives the deflecting signal S3 in such a way that the spot of the laser beam 21a is positioned at a line extending from the center of the above-mentioned exposed area 1 (FIG. 7b), and accordingly the laser beam 21a is incident upon the object lens 20. Then, at a time t2, the deflecting signal S3 of the laser beam 21 is off and the modulating signals S1 and S2 of the laser beams 21 and 22, respectively, are on, so that the laser beams 21 and 22 are again incident upon the object lens 20, resulting in exposed areas 24 and 25 on the photoresist film 6. The width d of each of the above-mentioned unexposed areas can be precisely adjusted by the deflection of the laser beam 21 by means of the deflector 16 or by the rotation of the reflector 19 by means of a reflector-rotating means (not shown).

The heights of the unexposed areas 23 and 23a of a pattern 66 that is obtained by the development of the photoresist film 6 depend upon the intensity of the laser beams 21 and 22, and the time length of the development or the like. The depth and width of the pits can be set at a desired value by controlling the intensity of the laser beam 21a (FIGS. 7a and 7b) at the times of formation of pits. In this way, the desired pattern 66 corresponding to the guide grooves 1 and the pits 2 of the optical disk 5 of FIG. 1 is formed on the resist film 6.

Figure 2C:
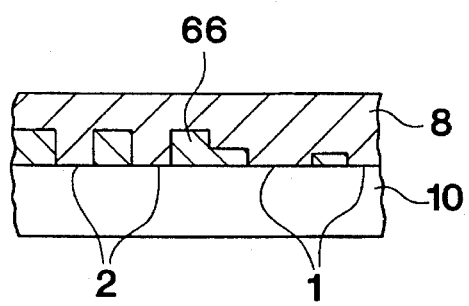
Figure 2D:

Then, on the disk plate 10 with the pattern 6 (FIG. 2b), as shown in FIG. 2c, a metal film 8 made of nickel (Ni) or the like is formed by the sputtering method, the vacuum evaporation method, the electroforming method, or the like, resulting in a stamper (i.e., a master plate) 88 shown in FIG. 2d. By the use of the stamper 88, an optical disk 5 such as that shown in FIG. 1 can be produced by an injection technique, a casting technique or the like. The bottom faces of the grooves 1 and the pits 2 of this optical disk 5 are very flat and smooth because they transcribe the surface of the glass or plastic disk plate 10 that is very flat and smooth.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical disk for use in optical memory device capable of recording and reproducing information by irradiation of a light beam, the disk comprising:

a disk plate having a first surface and a second surface;

an array of pits, arranged on a first top portion of the first surface, for storing information regarding the disk, each of the pits having a first depth which is defined by a bottom surface of each pit and the first top portion; and a plurality of guide grooves, formed on a second top portion of the first surface, for guiding the light beam so as to attain a guide tracking, each of the guide grooves having a second depth which is defined by a bottom surface of each guide groove and the second top portion;

wherein the first top portion is spaced a greater distance from the second surface than the second top portion, and the bottom surfaces of the pits and the guide grooves are equidistant from the second surface, thereby the first depth being greater than the second depth.

2. An optical disk according to claim 1, wherein the first depth is approximately $\lambda/4n$ and the second depth is approximately $\lambda/8n$.

3. An optical disk according to claim 1, wherein the second top portion defines lands formed between the guide grooves.

4. An optical disk according to claim 1, wherein the difference in spacing of the first and second top portions defines a step on the first surface.

5. An optical disk according to claim 1, wherein the information regarding the disk stored by the plurality of pits includes track addresses for identifying a position of each of the guide grooves.

6. An optical disk according to claim 1, wherein the information is recorded on the guide grooves.

* * * * *